Feb. 28, 1967     S. D. ROSS     3,307,085
CAPACITOR HAVING TWO ELECTROLYTES WITH DIFFERENT RESISTANCES
Filed June 4, 1964
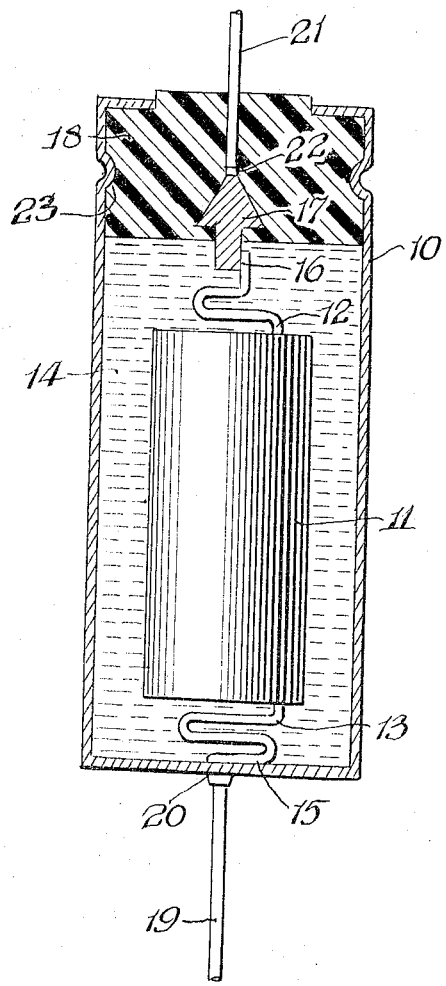
INVENTOR
*Sidney D. Ross*
BY *Connolly and Hutz*
ATTORNEYS United States Patent Office 3,307,085
Patented Feb. 28, 1967

3,307,085
CAPACITOR HAVING TWO ELECTROLYTES
WITH DIFFERENT RESISTANCES
Sidney D. Ross, Williamstown, Mass., assignor to Sprague Electric Company, North Adams, Mass., a corporation of Massachusetts
Filed June 4, 1964, Ser. No. 372,567
1 Claim. (Cl. 317—230)

The present invention is concerned with aluminum electrolytic capacitors and more particularly with such capacitors which are normally subject to internal corrosion.

The common corrosive agents: chlorides, sulfates, ammonia, etc., are abundant in our environment, and readily find their way into aluminum electrolytic capacitors. It is highly probable that all aluminum units contain some contaminants, yet not all capacitors fail because of corrosion. There are two possible explanations for the corrosion-caused failures. One is that all units contain a level of contamination close to the permissible margin of safety and some single part or manufacturing operation sporadically introduces an untoward amount of contamination which eventually results in corrosion. The other possibility is that the normal level of contaminants is harmless when homogeneously distributed throughout the capacitor, but causes corrosion when concentrated in some sensitive spot.

A mechanism which aids the concentration of contaminants at the known points of failure, is the absorption of water. An electrolyte such as glycol and a borate is quite hygroscropic. In a capacitance section impregnated with such an electrolyte, the section is exposed to the atmosphere for some considerable length of time; water is absorbed first on the exterior of the section and the tabs or leads and will then diffuse slowly toward the center.

Since diffusion is a relatively slow process, the outside of the section will always be richer in water than the center of the section. There will, in fact, be a sharp gradient in water concentration, with a maximum concentration on the exterior and a minimum concentration in the center. The metal foil is a barrier to penetration through the section in the direction perpendicular to the winding, and water will enter the interior only through the top and bottom where both the electrolyte and paper may act as wicks. The inhomogeneous distribution of water in the capacitance section tends to produce low resistance paths which concentrate the corrosive impurities at the internal leads or tabs and also at the points of contact of these members on the capacitor can cover.

It is the principal object of the present invention to present an electrolytic aluminum capacitor not subject to corrosion-caused failure.

Other objects and advantages of the present invention will be made obvious to those skilled in the art by the following description when considered in relation to the accompanying drawing of which:

The sole figure is a side view in section of the capacitor of the present invention.

The principal object of the present invention is achieved by surrounding the external surface of the capacitance section and the internal leads of an aluminum electrolytic capacitor with an electrolyte having a resistivity at least 5 times that of the electrolyte used to impregnate the section.

In the drawing, the capacitor depicted therein has a metal housing in the form of a can 10 in which is contained a capacitance section 11 of a convolutely wound assembly of aluminum foil and spacer elements. The section is impregnated with a liquid electrolyte, which is not shown. Aluminum tabs or leads 12 and 13 have an end affixed to their respective aluminum foil electrodes. The other end of tab 13 is spot-welded or otherwise affixed at 15 to the inside surface of can 10. In a similar manner the other end of tab 12 is spot-welded as at 16 to a metal plug 17, which plug is partially imbedded within elastomer bushing 18. An external lead-wire 19 for the can, is welded in place at 20. The second external lead-wire 21 is welded to metal plug 17 at 22.

Surrounding the liquid electrolyte-impregnated capacitance section 11 is a second electrolyte 14 which has a resistivity at least five times that of the electrolyte used to impregnate the section.

To provide a seal between elastomer bushing 18 and can 10, adjacent to the open end thereof, an inward beading 23 is provided. During the inward beading operation, the edge of can 10 is rolled over against the top of bushing 18.

A preferred, specific embodiment of the above-described capacitor involves the use of ethylene glycol and ammonium formate as the section-impregnating electrolyte. The resistivity of this electrolyte is about 250 ohm-cm. at 25° C. As the second electrolyte, which completely surrounds the capacitance section, a viscous liquid electrolyte comprising hydrogenated rosin, sodium hydroxide, borax and ethylene glycol is used. This electrolyte has a resistivity of about 1500 ohm-cm. at 25° C. Its resistivity can be increased up to about 50,000 by increasing the heating temperature during formation of this electrolyte.

In general, the second electrolyte can be any electrolyte which is not incompatible with the first or capacitance section-impregnated electrolyte and which has a resistivity of about five times that of said first electrolyte.

Examples of other electrolytes having comparatively low resistivities and thus of utility as the internal electrolyte are trifluoroacetic acid and monoethanolamine in ethylene glycol; ammonium borate in glycol, etc.

As is evident from the foregoing, the invention is not to be limited to formation of the rather specific illustrative device. Modifications and variations, as well as the substitutions of equivalents may be made without departing from the spirit of the invention as defined in the appended claims.

What is claimed is:

An aluminum electrolytic capacitor comprising an electrolytic capacitance section of convolutely wound aluminum foils separated by a spacer material, leads affixed to said foils and extending from said section; said section being impregnated with a first liquid electrolyte; a second electrolyte completely surrounding said impregnated section and said leads, said second electrolyte having a resistivity of at least five times that of said first electrolyte; and an outer protective container housing said section and said electrolytes.

References Cited by the Examiner
UNITED STATES PATENTS
3,010,056  11/1961  Kurland et al. _____ 317—230
3,255,390  6/1966   Ruscetta et al. _____ 317—230

JAMES D. KALLAM, Primary Examiner.